(12) United States Patent
Frank et al.

(10) Patent No.: US 7,924,881 B2
(45) Date of Patent: Apr. 12, 2011

(54) DATAGRAM IDENTIFIER MANAGEMENT

(75) Inventors: Charles William Frank, Irvine, CA (US); Thomas Earl Ludwig, San Clemente, CA (US); Richard W. Hull, Laguna Hills, CA (US); Mark Adams, Los Angeles, CA (US); Rochak Sharma, Irvine, CA (US); Adnan Khan, Aliso Viejo, CA (US); Samuel K. Baughman, Irvine, CA (US); Nicholas J. Witchey, Laguna Hills, CA (US)

(73) Assignee: Rateze Remote Mgmt. L.L.C., Wilmington, DE (US)

( * ) Notice: Subject to any disclaimer, the term of this patent is extended or adjusted under 35 U.S.C. 154(b) by 285 days.

(21) Appl. No.: 11/435,239

(22) Filed: May 15, 2006

(65) Prior Publication Data

US 2007/0237157 A1    Oct. 11, 2007

Related U.S. Application Data

(60) Provisional application No. 60/791,051, filed on Apr. 10, 2006.

(51) Int. Cl.
*H04J 3/24* (2006.01)
*G06F 15/16* (2006.01)
(52) U.S. Cl. ........................................ 370/474; 709/228
(58) Field of Classification Search ........................ None
See application file for complete search history.

(56) References Cited

U.S. PATENT DOCUMENTS 4,422,171 A * 12/1983 Wortley et al. ................ 714/748
4,890,227 A    12/1989 Watanabe et al.
5,129,088 A    7/1992  Auslander et al.
5,193,171 A    3/1993  Shinmura et al.
5,444,709 A *  8/1995  Riddle .......................... 370/474
5,506,969 A    4/1996  Wall et al.

(Continued)

FOREIGN PATENT DOCUMENTS

CN    1359214    7/2002

(Continued)

OTHER PUBLICATIONS

International Search Report and Written Opinion of the International Searching Authority for PCT/US07/08896 mailed Apr. 9, 2004 (11 pages).

(Continued)

*Primary Examiner* — Ayaz R Sheikh
*Assistant Examiner* — Timothy J Weidner
(74) *Attorney, Agent, or Firm* — Schwabe, Williamson & Wyatt, P.C.

(57) ABSTRACT

Systems and methods ensure that datagrams retain integrity in light of the problems associated with the internetworking protocol's use of datagram identifiers drawn from a first pool of datagram identifiers. The methods involve controlling the use of datagram identifiers to ensure that only certain identifiers are allowable. A second pool of datagram identifiers is created that is different from the first pool. A datagram identifier is drawn from the second pool and assigned to a datagram in a manner that the datagram identifier is controlled from being reused during the lifetime of the datagram. In alternative embodiments the number of available datagram identifiers is either increased through optional header fields, or reduced through tracking allowed datagram identifiers. A first host notifies a second host of an allowed identifier. The second host uses the allowed identifier as a datagram identifier.

9 Claims, 9 Drawing Sheets

Lists of Datagram Identifiers

U.S. PATENT DOCUMENTS

| | | | |
|---|---|---|---|
| 5,546,541 A | 8/1996 | Drew et al. | |
| 5,590,124 A | 12/1996 | Robins | |
| 5,590,276 A | 12/1996 | Andrews | |
| 5,634,111 A | 5/1997 | Oeda et al. | |
| 5,742,604 A | 4/1998 | Edsall et al. | |
| 5,758,050 A | 5/1998 | Brady et al. | |
| 5,758,188 A | 5/1998 | Appelbaum et al. | |
| 5,867,686 A | 2/1999 | Conner et al. | |
| 5,884,038 A | 3/1999 | Kapoor | |
| 5,889,935 A | 3/1999 | Ofek et al. | |
| 5,930,786 A | 7/1999 | Carino, Jr. et al. | |
| 5,937,169 A | 8/1999 | Connery et al. | |
| 5,949,977 A | 9/1999 | Hernandez | |
| 5,991,891 A | 11/1999 | Hahn et al. | |
| 6,018,779 A | 1/2000 | Blumenau | |
| 6,081,879 A | 6/2000 | Arnott | |
| 6,101,559 A | 8/2000 | Schultz et al. | |
| 6,105,122 A | 8/2000 | Muller et al. | |
| 6,128,664 A | 10/2000 | Yanagidate et al. | |
| 6,157,935 A | 12/2000 | Tran et al. | |
| 6,157,955 A | 12/2000 | Narad et al. | |
| 6,181,927 B1* | 1/2001 | Welling et al. | 455/414.1 |
| 6,202,060 B1 | 3/2001 | Tran | |
| 6,246,683 B1 | 6/2001 | Connery et al. | |
| 6,253,273 B1 | 6/2001 | Blumenau | |
| 6,275,898 B1 | 8/2001 | Dekoning | |
| 6,288,716 B1 | 9/2001 | Humpleman et al. | |
| 6,295,584 B1 | 9/2001 | DeSota et al. | |
| 6,330,236 B1 | 12/2001 | Ofek et al. | |
| 6,330,615 B1 | 12/2001 | Gioquindo et al. | |
| 6,385,658 B1 | 5/2002 | Baker-Harvey | |
| 6,396,480 B1 | 5/2002 | Schinder et al. | |
| 6,401,183 B1 | 6/2002 | Rafizadeh | |
| 6,434,147 B1* | 8/2002 | Brown et al. | 370/394 |
| 6,434,683 B1 | 8/2002 | West et al. | |
| 6,449,607 B1 | 9/2002 | Tomita et al. | |
| 6,466,571 B1 | 10/2002 | Dynarski et al. | |
| 6,470,342 B1* | 10/2002 | Gondi et al. | 707/10 |
| 6,473,774 B1 | 10/2002 | Cellis et al. | |
| 6,480,934 B1 | 11/2002 | Hino et al. | |
| 6,487,555 B1 | 11/2002 | Bharat et al. | |
| 6,535,925 B1* | 3/2003 | Svanbro et al. | 709/247 |
| 6,549,983 B1 | 4/2003 | Han et al. | |
| 6,567,863 B1 | 5/2003 | Lafuite et al. | |
| 6,587,464 B1* | 7/2003 | Brown et al. | 370/394 |
| 6,601,101 B1 | 7/2003 | Lee et al. | |
| 6,601,135 B1 | 7/2003 | McBrearty et al. | |
| 6,618,743 B1 | 9/2003 | Bennett | |
| 6,629,264 B1 | 9/2003 | Sicola et al. | |
| 6,681,244 B1 | 1/2004 | Cross et al. | |
| 6,693,912 B1 | 2/2004 | Wang | |
| 6,701,431 B2 | 3/2004 | Subramanian et al. | |
| 6,701,432 B1 | 3/2004 | Deng et al. | |
| 6,710,786 B1* | 3/2004 | Jacobs et al. | 715/744 |
| 6,711,164 B1 | 3/2004 | Le et al. | |
| 6,728,210 B1* | 4/2004 | El-Khoury et al. | 370/231 |
| 6,732,171 B2 | 5/2004 | Hayden | |
| 6,732,230 B1 | 5/2004 | Davis et al. | |
| 6,741,554 B2 | 5/2004 | D'Amico et al. | |
| 6,754,662 B1 | 6/2004 | Li | |
| 6,757,845 B2 | 6/2004 | Bruce | |
| 6,772,161 B2 | 8/2004 | Mahalingam | |
| 6,775,672 B2 | 8/2004 | Mahalingam et al. | |
| 6,775,673 B2 | 8/2004 | Mahalingam et al. | |
| 6,795,534 B2 | 9/2004 | Noguchi | |
| 6,799,244 B2 | 9/2004 | Tanaka et al. | |
| 6,799,255 B1 | 9/2004 | Blumenau et al. | |
| 6,834,326 B1 | 12/2004 | Wang et al. | |
| 6,853,382 B1 | 2/2005 | Van Dyke et al. | |
| 6,854,021 B1 | 2/2005 | Schmidt et al. | |
| 6,862,606 B1 | 3/2005 | Major et al. | |
| 6,876,657 B1 | 4/2005 | Brewer et al. | |
| 6,882,637 B1* | 4/2005 | Le et al. | 370/349 |
| 6,886,035 B2 | 4/2005 | Wolff | |
| 6,894,976 B1* | 5/2005 | Banga et al. | 370/235 |
| 6,895,461 B1 | 5/2005 | Thompson | |
| 6,895,511 B1 | 5/2005 | Borsato et al. | |
| 6,901,497 B2 | 5/2005 | Tashiro et al. | |
| 6,904,470 B1 | 6/2005 | Ofer et al. | |
| 6,907,473 B2 | 6/2005 | Schmidt et al. | |
| 6,912,622 B2 | 6/2005 | Miller | |
| 6,917,616 B1 | 7/2005 | Normand et al. | |
| 6,922,688 B1 | 7/2005 | Frey, Jr. | |
| 6,928,473 B1* | 8/2005 | Sundaram et al. | 709/224 |
| 6,941,555 B2 | 9/2005 | Jacobs et al. | |
| 6,947,430 B2 | 9/2005 | Bilic et al. | |
| 6,985,956 B2 | 1/2006 | Luke et al. | |
| 7,039,934 B2 | 5/2006 | Terakado et al. | |
| 7,051,087 B1 | 5/2006 | Bahl et al. | |
| 7,065,579 B2 | 6/2006 | Traversat et al. | |
| 7,069,295 B2 | 6/2006 | Sutherland et al. | |
| 7,073,090 B2 | 7/2006 | Yanai et al. | |
| 7,111,303 B2 | 9/2006 | Macchiano et al. | |
| 7,120,666 B2 | 10/2006 | McCanne et al. | |
| 7,145,866 B1 | 12/2006 | Ting et al. | |
| 7,146,427 B2* | 12/2006 | Delaney et al. | 709/237 |
| 7,149,769 B2 | 12/2006 | Lubbers et al. | |
| 7,152,069 B1 | 12/2006 | Santry et al. | |
| 7,184,424 B2 | 2/2007 | Frank et al. | |
| 7,188,194 B1 | 3/2007 | Kuik et al. | |
| 7,200,641 B1* | 4/2007 | Throop | 709/217 |
| 7,203,730 B1 | 4/2007 | Meyer et al. | |
| 7,206,805 B1 | 4/2007 | McLaughlin, Jr. | |
| 7,237,036 B2 | 6/2007 | Boucher et al. | |
| 7,260,638 B2 | 8/2007 | Crosbie | |
| 7,263,108 B2 | 8/2007 | Kizhepat | |
| 7,278,142 B2 | 10/2007 | Bandhole et al. | |
| 7,296,050 B2 | 11/2007 | Vicard | |
| 7,327,735 B2* | 2/2008 | Robotham et al. | 370/394 |
| 7,333,451 B1* | 2/2008 | Khalil et al. | 370/331 |
| 7,353,266 B2 | 4/2008 | Bracewell et al. | |
| 7,406,523 B1* | 7/2008 | Kruy et al. | 709/227 |
| 7,415,018 B2* | 8/2008 | Jones et al. | 370/392 |
| 7,428,584 B2 | 9/2008 | Yamamoto et al. | |
| 7,436,789 B2* | 10/2008 | Caliskan et al. | 370/310.1 |
| 7,447,209 B2* | 11/2008 | Jeffay et al. | 370/392 |
| 7,463,582 B2* | 12/2008 | Kelly et al. | 370/229 |
| 7,526,577 B2* | 4/2009 | Pinkerton et al. | 709/249 |
| 7,535,913 B2* | 5/2009 | Minami et al. | 370/401 |
| 7,742,454 B2* | 6/2010 | Venkatsubra | 370/338 |
| 2001/0020273 A1 | 9/2001 | Murakawa | |
| 2001/0026550 A1 | 10/2001 | Koabayashi | |
| 2001/0049739 A1 | 12/2001 | Wakayama et al. | |
| 2002/0026558 A1 | 2/2002 | Reuter | |
| 2002/0029286 A1 | 3/2002 | Gioquindo et al. | |
| 2002/0039196 A1 | 4/2002 | Chiarabini | |
| 2002/0052962 A1* | 5/2002 | Cherkasova et al. | 709/229 |
| 2002/0062387 A1 | 5/2002 | Yatziv | |
| 2002/0065875 A1 | 5/2002 | Bracewell et al. | |
| 2002/0087811 A1 | 7/2002 | Khare | |
| 2002/0091830 A1 | 7/2002 | Muramatsu | |
| 2002/0126658 A1 | 9/2002 | Yamashita | |
| 2002/0165978 A1 | 11/2002 | Chui | |
| 2003/0018784 A1 | 1/2003 | Lette et al. | |
| 2003/0023811 A1 | 1/2003 | Kim et al. | |
| 2003/0026246 A1 | 2/2003 | Huang et al. | |
| 2003/0065733 A1 | 4/2003 | Pecone | |
| 2003/0069995 A1 | 4/2003 | Fayette | |
| 2003/0081592 A1* | 5/2003 | Krishnarajah et al. | 370/352 |
| 2003/0118053 A1 | 6/2003 | Edsall et al. | |
| 2003/0130986 A1 | 7/2003 | Tamer et al. | |
| 2003/0161312 A1* | 8/2003 | Brown et al. | 370/392 |
| 2003/0172157 A1 | 9/2003 | Wright et al. | |
| 2003/0182349 A1 | 9/2003 | Leong et al. | |
| 2003/0202510 A1 | 10/2003 | Witkowski et al. | |
| 2003/0204611 A1 | 10/2003 | McCosh et al. | |
| 2004/0025477 A1 | 2/2004 | Sichera et al. | |
| 2004/0047367 A1 | 3/2004 | Mammen | |
| 2004/0078465 A1 | 4/2004 | Coates et al. | |
| 2004/0100952 A1 | 5/2004 | Boucher et al. | |
| 2004/0181476 A1 | 9/2004 | Smith et al. | |
| 2004/0184455 A1 | 9/2004 | Lin | |
| 2004/0213226 A1* | 10/2004 | Frank et al. | 370/389 |
| 2005/0033740 A1 | 2/2005 | Cao et al. | |
| 2005/0058131 A1* | 3/2005 | Samuels et al. | 370/389 |
| 2005/0102522 A1* | 5/2005 | Kanda | 713/176 |
| 2005/0144199 A2 | 6/2005 | Hayden | |

| | | | |
|---|---|---|---|
| 2005/0166022 | A1 | 7/2005 | Watanabe |
| 2005/0175005 | A1 | 8/2005 | Brown |
| 2005/0198371 | A1 | 9/2005 | Smith et al. |
| 2005/0246401 | A1 | 11/2005 | Edwards et al. |
| 2005/0267929 | A1 | 12/2005 | Kitamura |
| 2005/0270856 | A1 | 12/2005 | Earhart et al. |
| 2005/0286517 | A1* | 12/2005 | Babbar et al. ............ 370/389 |
| 2006/0036602 | A1 | 2/2006 | Unangst et al. |
| 2006/0077902 | A1* | 4/2006 | Kannan et al. ............ 370/250 |
| 2006/0133365 | A1 | 6/2006 | Manjunatha et al. |
| 2006/0168345 | A1 | 7/2006 | Siles et al. |
| 2006/0176903 | A1 | 8/2006 | Coulier |
| 2007/0101023 | A1 | 5/2007 | Chhabra et al. |
| 2007/0110047 | A1 | 5/2007 | Kim |
| 2007/0230476 | A1* | 10/2007 | Ding ............................ 370/394 |
| 2008/0181158 | A1* | 7/2008 | Bouazizi et al. ............ 370/312 |
| 2008/0279106 | A1* | 11/2008 | Goodfellow et al. ........ 370/238 |

FOREIGN PATENT DOCUMENTS

| | | |
|---|---|---|
| EP | 0485110 | 5/1992 |
| EP | 0700231 | 3/1996 |
| EP | 0706113 | 4/1996 |
| EP | 0654736 | 5/1999 |
| JP | 2001094987 | 4/2001 |
| JP | 2001359200 | 12/2001 |
| JP | 2002252880 | 9/2002 |
| JP | 2002318725 | 10/2002 |
| JP | 2005265914 | 9/2005 |
| WO | WO/01/01270 | 4/2001 |
| WO | WO02/15018 | 2/2002 |

OTHER PUBLICATIONS

International Preliminary Report on Patentability for PCT/US2007/008896 mailed Oct. 23, 2008 (7 pages).

Thomas E. Anderson, Michael D. Dahlin, Jeanna M. Neefe, David A. Patterson, Drew S. Roselli, and Randolph Y. Wang, Severless network file systems. Dec. 1995. In Proceedings of the 15th Symposium on Operating Systems Principles.

International Search Report for Application No. PCT/US02/40205 dated May 27, 2004.

Lee et al. "A Comparison of Two Distributed Disk Systems" Digital Systems Research Center—Research Report SRC-155, Apr. 30, 1998, XP002368118.

Bruschi and Rosti, "Secure multicast in wireless networks of mobile hosts: protocols and issues", Mobile Networks and Applications, vol. 7, Issue 6 (Dec. 2002), pp. 503-511.

Satran et al. "Internet Small Computer Systems Interface (iSCSI)" IETF Standard, Internet Engineering Task Force, IETF, CH, Apr. 2004, XP015009500, ISSN: 000-0003.

"Limited distributed DASD Checksum, a RAID Hybrid" IBM Technical Disclosure Bulletin, vol. 35, No. 4a, Sep. 1992, pp. 404-405, XP000314813 Armonk, NY, USA.

Lin, J.C. and Paul, S., "RMTP: A Reliable Multicast Transport Protocol," Proceedings of IEEE INFOCOM '96, vol. 3, pp. 1-11, 1996.

Quinn, B., et al, "IP Multicast Applications: Challenges and Solutions," Network Working Group, RFC 3170, pp. 1-28, Sep. 2001.

Kim, et al., "Internet Multicast Provisioning Issues for Hierarchical Architecture", Networks, 2001, Proceedings, 9th IEEE Int'l Conference, published Oct. 12, 2001, pp. 401-404.

Lee et al., "Petal: Distributed Virtual Disks", 7th International Conference on Architectural Support for Programming Languages and Operating Systems. Cambridge, MA. Oct. 1-5, 1996. ASPLOS, New. vol. Conf 7, Oct. 1, 1996, pp. 1-9, XP000681711, ISBN: 0-89791-767-7.

PCT International Search Report for Application No. PCT/US05/01542 dated Aug. 25, 2008.

VMWare Workstation 4 User's Manual, VMWare, Inc., pp. 1-326, Copyright 1998-2002.

Chavez et al., "A Multi-Agent System for Distributed Resource Allocation," MIT Media Lab, XP002092534, published May 2, 1997.

* cited by examiner

IPv4 Datagram Header

IP Datagram

IPv6 Header with Extended Datagram Identifier

Lists of Datagram Identifiers

DATAGRAM IDENTIFIER MANAGEMENT

This patent application claims priority to provisional patent application Ser. No. 60/791,051 filed on Apr. 10, 2006.

FIELD OF THE INVENTION

The field of invention relates to reliably transferring a datagram over an internetworking protocol.

BACKGROUND OF THE INVENTION

On Apr. 4, 2006, a notification was published referencing a problem with the standard internetworking protocol Ipv4 as defined in RFC 791 maintained by the Internet Engineering Task Force (IETF). The reference written by J. Heffner, M. Mathis, and B. Chandler (herein incorporated by reference in its entirety) describes how datagrams transferred over Ipv4 can suffer data corruption due to issues relating to the datagram identification field within an Ipv4 header. The datagram corruption results from having a limited number of available datagram identifiers during the lifetime of the datagram. No solution to the problem was offered by the authors.

IPv4 can transfer a datagram having a size up to 65,535 ($2^{16}$) bytes in size. An Internetworking Protocol (IP) layer of a protocol stack including IPv4 can assign the datagram a 16-bit identifier which implies there are 65,535 possible datagram identifiers. Typically, an IP datagram identifier is implemented as a counter that is incremented every time a datagram identifier is used. When the counter reaches its maximum value, 65,535 for a 16-bit counter, the value returns to zero. The IP will fragment a large datagram into smaller chunks to send the fragments over a media, Ethernet for example. If Ethernet supports 1500 byte frames, then the IP layer will create up to 44 frames where each frame has the same datagram identifier and has an offset into the datagram. The datagram identifier and offset information are used by a remote host to reassemble the datagram before passing the datagram to the upper layers of the communication stack. For high speed media a host could send more than 65,535 datagrams in a very short time causing the host to wrap the value of the datagram identifier counter. For example, if Ethernet running at 1 Gigabit per second (Gbps) is used, the datagram identifier counter could wrap in less than 1 second assuming relatively small datagrams. Most communication stacks hold a datagram for reassembly from 30 seconds to 120 seconds. Therefore, if a datagram having a specific datagram identifier is stored in memory for reassembly and one of its fragments is lost, then a subsequent, different datagram fragment having the same identifier could cause a corruption of the first datagram. The corruption occurs because the receiving host interprets the fragment from the second datagram as belonging to the first datagram because it has the same datagram identifier and offset. This problem applies to TCP, UDP, ICMP, or other data transported over IP. The problem can be characterized as resulting from using a pool of datagram identifiers where the pool has a limited number of available datagram identifiers while the datagram is alive in the system.

Interestingly, Zetera™ Corporation, a producer of network storage technology, encountered and resolved the datagram corruption problem in the same time frame as the public release of the problem statement. Zetera discovered the problem while running a proprietary storage protocol, the Z-SAN™ protocol, over UDP/IP on a 1 Gbps Ethernet system. Zetera has created a solution that solves the problem as described in Zetera U.S. provisional patent application assigned Ser. No. 60/791,051 field on Apr. 10, 2006 herein incorporated by reference in its entirety.

Further research regarding the datagram corruption issue indicates that the problem has manifested itself as far back as 1987 when customers of Sun's Network File System (NFS) implementation suffered from data corruption. NFS used 8 KB UDP datagrams that would become corrupted for the reason described above. Implementations of NFS addressed the problem by shortening the time NFS waits for a response at the application layer, or through large checksum values on the datagram (32-bit checksums or greater). Such solutions mitigate the risk of loss, but do not create a solution for the problem. In addition, short timeouts reduce efficiency of the system because the system must conduct additional retries.

U.S. Pat. No. 6,894,976 titled "Prevention and detection of IP identification wraparound errors" teaches a method of reducing the risk associated with the problem of IP datagram identifier wrap around through the use of timeouts and checksums. However, this reference does not present a viable solution for the problem that applies to all IP based applications.

The described problem is an inherent part of standardized IPs and can not be resolved universally without changing the standard. However, it is desirable to have a real solution that can resolve the issue in a manner that applies to network storage, other network devices, or network applications. It is contemplated that a real solution would be adopted by the standards. A desirable solution should have the following characteristics:

The solution should operate at the IP layer so that applications do not have to change.

The solution should have backward compatibility so if any changes are required in the standard, then new versions of a communications stack could operate with legacy stacks.

The solution should require minimal changes to existing stacks.

The solution should be future proof with respect of the ever increasing rate of data transfer (10 Gpbs, 100 Gpbs, etc. . . . ).

The solution should couple a datagram identifier with the datagram lifetime to aid in controlling the use of the datagram identifiers.

Clearly there remains a long felt need for a solution to the datagram corruption problem. Preferably the solution completely addresses the problem rather than simply mitigating the risk of the problem occurring.

SUMMARY OF THE INVENTION

The inventive subject matter comprises methods for resolving a datagram corruption problem that results from using datagram identifiers from a pool of identifiers that have a limited supply. The methods include providing a pool of identifiers that is different than the first pool and assigning a datagram identifier drawn from the second pool to a datagram. Furthermore, the datagram identifier is controlled from being reused during the lifetime of the datagram to ensure the corruption problem does not arise. In some embodiments, the second pool of datagram identifiers comprises a larger number of datagram identifiers and in other embodiments the second pool comprises a smaller number of datagram identifiers. In preferred embodiments where the number of available datagram identifiers is increased, the time in which the increased number of identifiers is consumed exceeds the time period in which the datagram corruption problem is likely to occur in light of the datagram transfer rate. In other preferred embodiments where the number of available datagram identifiers is reduced, especially down to a single identifier, the identifier is controlled from being reused with subsequent datagrams.

Especially preferred embodiments comprise storage protocols that utilize the methods disclosed. Data is exchanged with a storage device using the storage protocols via the contemplated datagrams. Storage protocols include proprietary storage protocols or standard storage protocols. Examples of standard storage protocols include iSCSI, FCIP, or iFCP.

In some embodiments, a first host keeps track of which datagram identifiers are currently in use. The first host notifies a second host of a datagram identifier that is allowable; then the second host uses the datagram identifier for a datagram sent back to the first host. The second host will not use the datagram identifier again unless the first host indicates that it can be reused. The first host tracks used datagram identifiers through a list. The datagram identifier is associated with the datagram in manner that communication protocol stacks are able to reassemble fragmented datagrams as they normally would. Datagram identifiers that have been recently used are controlled from being used again to ensure that following datagrams do not corrupt the reassembly of the current datagram.

The teachings herein may be advantageously employed by developers of networking applications that use internetworking protocols to resolve datagram corruption that can cause data corruption. The methods presented can be used in conjunction with TCP or UDP transports or other protocols that leverage IP for sending datagrams. The methods are especially useful for deployment in network devices accessible by clients including data storage applications where data integrity is a paramount concern.

Glossary

The following descriptions refer to terms used within this document. The terms are provided to ensure clarity when discussing the various aspects of the invention matter, without implied limitation, and to reduce repetition within the body of the document.

The term "datagram" means a chunk of data sent over a communications link where the chunk can be fragmented into smaller pieces for ease of delivery. Typically, datagrams are associated with internetworking protocols (IP) including IPv4 or IPv6. In addition a datagram is identified through a datagram identifier to aid in reassembly of the fragments.

Various objects, features, aspects, and advantages of the present invention will become more apparent from the following detailed description of the preferred embodiments of the invention, along with the accompanying drawings in which like numerals represent like components.

DETAILED DESCRIPTION

Figure 1A:
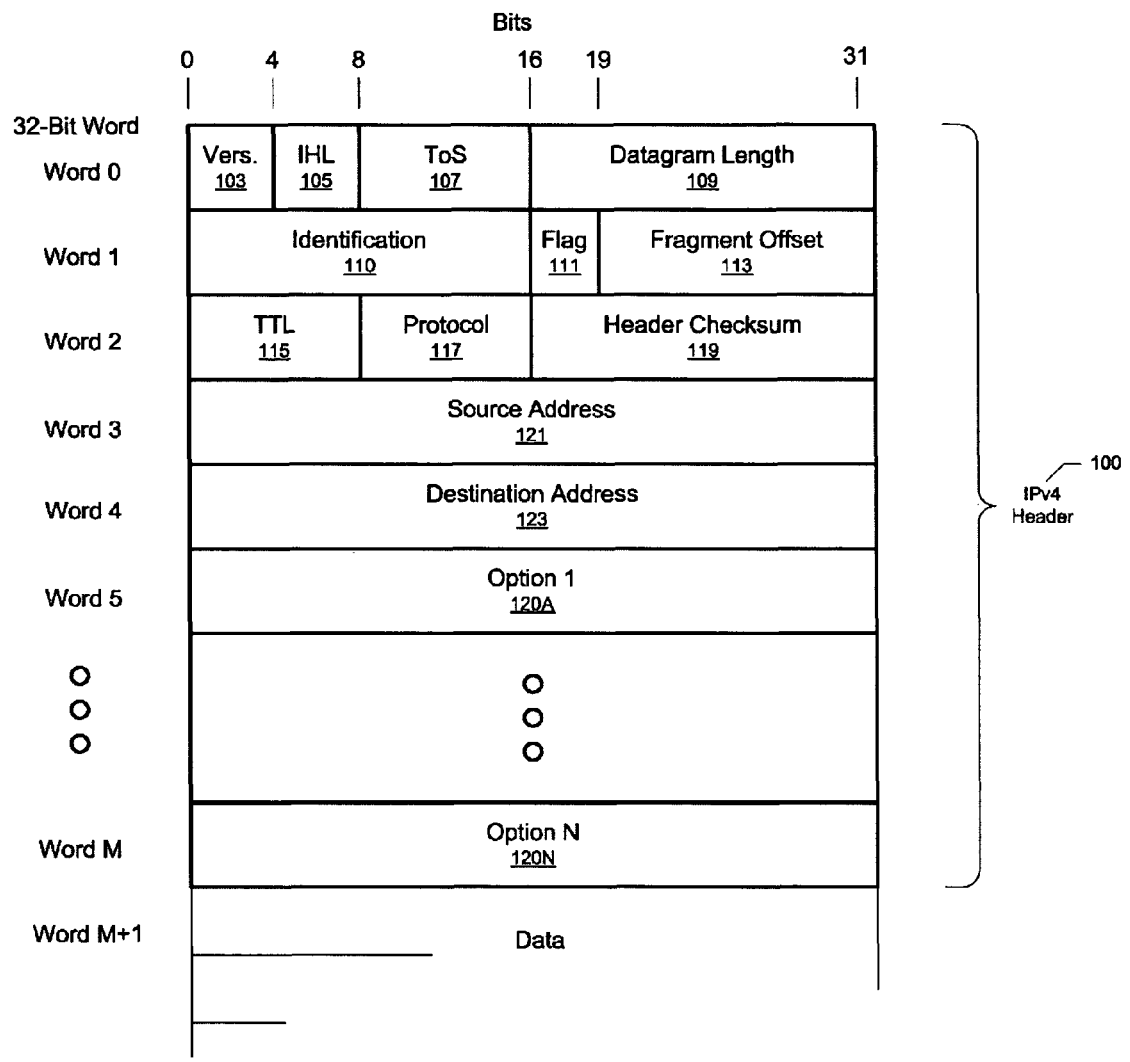
FIG. 1A displays a prior art IPv4 header.

The following description presents several examples to convey the concepts of the inventive subject matter. Although examples are used, they do not in any way limit the scope of the material. The presented embodiments should be interpreted to their broadest extent.

Brief Overview

A solution is described for resolving problems relating to unreliable IP fragmentation on a high speed network. IP fragmentation relates to an IP layer of a communication stack performing fragmentation of a datagram possibly transporting other protocols including TCP, UDP, ICMP, IGMP, or other protocols and matching the datagram to a Maximum Transfer Unit (MTU) of a physical media. Fragmentation is necessary given that IP deals with communication using virtual addresses and that IP needs to align the datagram transfer with the actual physical media which typically has a fixed maximum size. Datagrams can have a length of up to 65,535 bytes where an 802.3 Ethernet physical layer typically has a maximum size of 1500 bytes. IP performs both the fragmentation of the datagram during a transmit operation and the reassembly of the datagram upon reception. For example, the process to perform reassembly is done through an association of fields in an IPv4 header including the source IP Address (32 bits), datagram identification field (16 bits), flags (3 bits), and fragment offset field (13 bits).

Multiple datagrams in-flight are identified through a datagram identifier which has a length of 16 bits in IPv4. Typically, an IP layer in a communication stack uses a counter which increments by one every time a datagram identifier is used. The value of the counter represents the datagram identifier. The datagram corruption problem arises in reassembly; the IP layer will retain fragments of a datagram for reassembly for up to 120 seconds. Specifically, Windows® uses a 60 second window and Linux uses a 30 second window. A worst case scenario can be constructed to illustrate the issue.

Assume a fragmented datagram where one of the fragments is not received causing the receive buffer to attempt reassembly for the next 120 sec. Communication then continues using additional IP datagrams that also have multiple fragments. On a network supporting 1 Gbps, the datagram identifier will wrap in about 30 seconds. In particular a protocol using a payload size of 512 bytes would encounter a wrap in about 270 milliseconds. Considering that the IP layer waits for up to 120 sec, there is ample opportunity for incorrect association of a fragment with the original datagram; thereby, resulting in corrupted data. A payload checksum can be used to attempt to negate this situation; however, a checksum field of 16 bits and using random data, the data corruption can occur using these worst case numbers every 4.8 hours. A 10 Gbps suffers the problem ten times faster.

Clearly, this situation needs to be addressed. The situation can be addressed by adding additional optional fields to the IP headers of the datagram. The optional fields, in some embodiments, comprise extended datagram identification information which can be used by hosts to increase the pool of available datagram identifiers. If the pool has sufficient size relative to the speed of the network and to the rate at which datagrams are sent, then the increased pool of available datagram identifiers will have sufficient resolution to ensure that datagram corruption will not occur. The available datagram identifiers are controlled from being reused by their sheer number.

In an alternative embodiment for protocols where each command has a distinct response, a datagram comprising a command will also include a datagram identifier in the payload. Then the response datagram will use the identifier in its response both in the payload and in the IP layer header. A host can then use an exclusion table or list to avoid the reuse of datagram identifier during the datagram's lifetime. The exclusion table can then be scrubbed based upon entries living longer than a timeout period, which will guarantee no mismatched associations. If the exclusion list becomes full, the network is perceived as too dirty. Therefore, the solution is to create a pool of datagram identifiers that has a reduced number of available datagrams that can be controlled by one host.

Datagram Identification for Internetworking Protocols

Internetworking protocols (IP) can include standardized IPs, for example IPv4 or IPv6. Even though IPv4 and IPv6 are standardized, they have problems as previously described due to how they identify datagrams for reassembly.

FIG. 1A displays a prior art IPv4 header. The IPv4 header is described fully in RFC 791 herein incorporated by reference in its entirety. Header 100 comprises a number of standardized fields including the following fields:

Version 103: The version of the IP protocol. IPv4 uses the value of 4.
IP header length 105: The number of 32-bit words in the IPv4 header with a minimum value of five.
Type of Service (ToS) 107: Provides indication of quality of service.
Datagram Length 109: The length of the datagram in octets (bytes).
Identification 110: The 16-bit identifier to distinguish one datagram from another with respect to the source and destination for use in fragmentation or reassembly.
Flags 111: Flags to control fragmentation.
Fragment offset 113: Offset of the current fragment in octets in eight byte increments.
Time To Live (TTL) 115: Number of allowed hops before datagram is discarded.
Protocol 117: Protocol number associated with the transport of the datagram. Protocols include ICMP, TCP, UDP, or others.
Header checksum 119: Checksum for the IPv4 header only.
Source address 121: The IPv4 address of the source of the datagram.
Destination address 123: The IPv4 address of the destination of the datagram.
Option 120A through 120N: Options that can extend the IPv4 header.

The IPv4 standard states in RFC 791 that identification 110 "must be unique for that source-destination pair and protocol for the time that datagram will be active in the internet system." Although there are numerous ways to pick a value for identification 110, no guidance is offered in the standard to ensure identification 110 is unique for the lifetime of the datagram. Typically, implementations of IPv4 use a counter that is incremented by one every time a datagram is used. Clearly, identification 110 as implemented by most IPv4 implementations do not follow the standard when the lifetime of the datagram exceeds the time it takes for a wrap condition to occur. Simply put the 16-bits of information in identification 110 represents a pool of datagram identifiers that is insufficient to maintain uniqueness for a datagram lifetime.

Figure 1B:
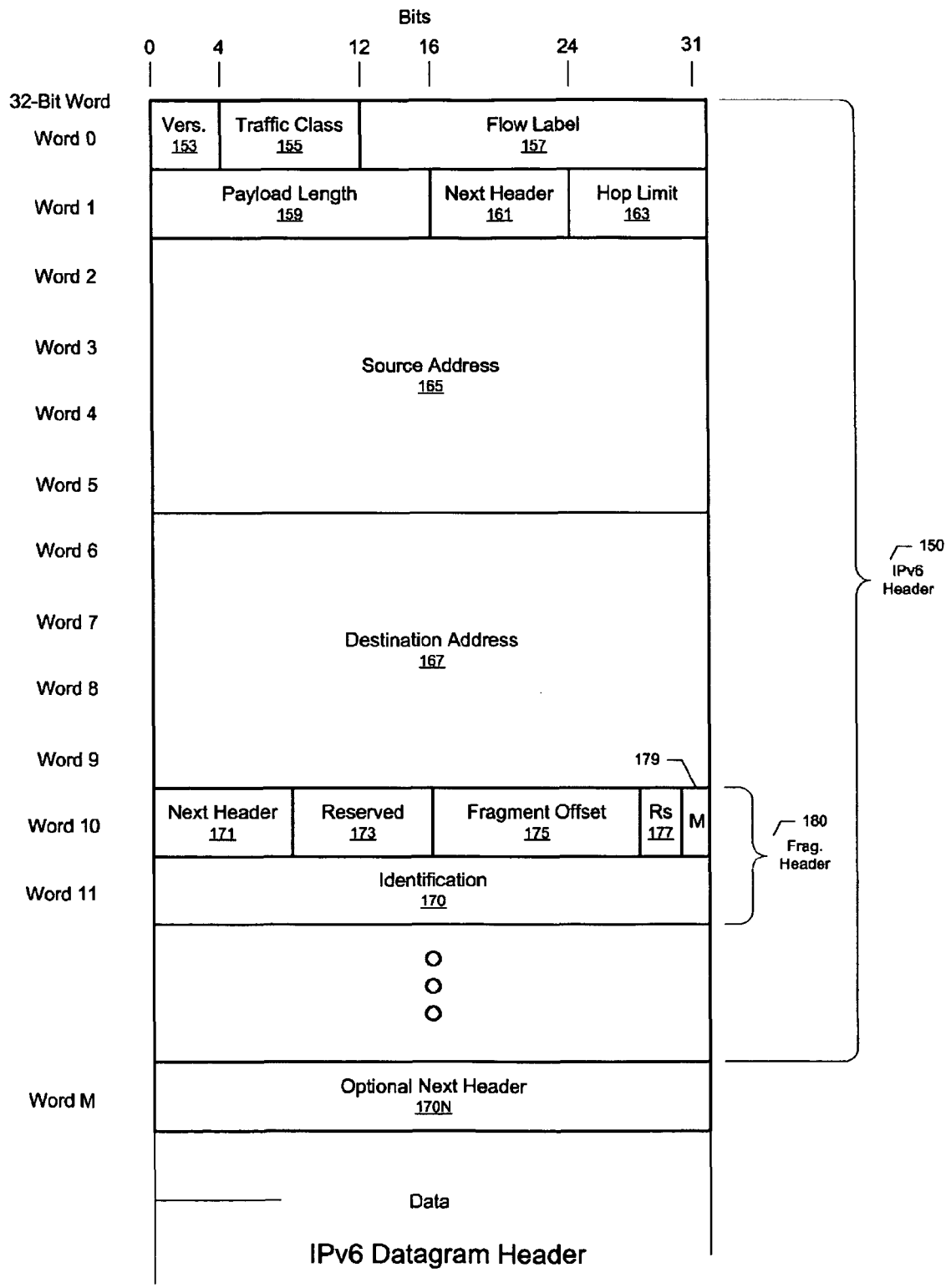
FIG. 1B displays a prior art IPv6 header.

FIG. 1B displays a prior art IPv6 header. The IPv6 standard is described in RFC 2460 which is herein incorporated by reference in its entirety. RFC 2460 provides details of IPv6 header 150. With respect to fragmentation, IPv6 header 150 handles fragmentation information through a "next header" field rather than in the main header itself. Furthermore, IPv6 expects the source to fragment a datagram rather as opposed intermediary devices fragmenting the datagram as can happen in IPv4. IPv6 header 150 comprises the following fields:

Version 153: The version of IP protocol. IPv6 uses a value of six.
Traffic class 155: Used to prioritize different types of traffic.
Flow label 157: Indicates quality of service.
Payload length 159: Length of the data in the datagram excluding the main header and including any next header fields.
Next header 161: A value indicating the type of the next header. The values are well defined. See RFC 1700 maintained by the IETF.
Hop limit 163: The number of hops that a datagram will be allowed to travel.
Source address 165: The IPv6 address of the source of the datagram.
Destination address 167: The IPv6 address of the destination of the datagram.

The preceding fields comprise the mandatory components of IPv6 header 150. Additional headers are allowed by setting appropriate values to next header 161. For example, if next header 161 has a value of six, the next header will be a TCP header; if next header 161 has a value of 17, the next header will be a UDP header; or if next header 161 has a value of 44, the next header will be a fragment header. Fragment header 180 comprises the following fields used for fragmentation:

Next header 171: Points to the next header in the datagram using the same numbering scheme as next header 161.
Fields 173 and 177: Reserved for future use.
Fragment offset 175: Offset of the current fragment in octets in eight byte increments.
More fragments 179: A bit value indicating that more fragments exist.
Identification 170: The 32-bit identifier used to distinguish one datagram from another with respect to the source and destination.

Just as in RFC 791 for IPv4, RFC 2460 states identification 170 should have a value that "must be different than that of any other fragmented packet sent recently with the same source address and destination address." RFC 2460 suggests using multiple counters for each pair; however, it does not suggest or motivate using multiple fields for a datagram identifier. Although identification 170 comprises a 32-bit value, it is expected that as networking speeds increase, IPv6 could experience the same data corruption problem as IPv4 does at lower speeds. For example, assuming minimal fragmented IPv6 datagrams, if the line speed is 100 Gbps, then the pool of $2^{32}$ values for identification 170 could be consumed in less than 180 seconds, about three minutes, approaching the lifetime of a datagram on the network. If the line speed is 1000 Gbps, then the pool of $2^{32}$ values for identification 170 could be consumed in less than 18 seconds, well below the 30 to 120 second lifetime of a datagram.

Datagrams of 512 bytes were chosen in the preceding example because block-level network storage typically operates in 512 byte blocks, although multiple blocks can be concatenated into a single datagram for reading or writing to storage media. Furthermore, the contemplated communication speeds are not unrealistic because it is possible to utilize an IP as an internal communication bus where distances are small and data rates can be high.

Datagram Identifiers

In a preferred embodiment, datagram identifiers represent a much broader concept than just identification fields (identification 110 and 170) in an IP datagram header field. Datagram identifiers comprise one or more values that together allow a datagram to be uniquely identified between a source and destination during the lifetime of the datagram. The "uniqueness" of the datagram identifier does not have to be forever. In other words, after the lifetime of the datagram has been exceeded, the datagram identifier can be reused to identify any subsequently sent datagram.

Multiple Field Datagram Identifiers

Datagram identifiers include single field identifiers or multiple field identifiers. Single field identifiers are those having a single value assigned to a datagram to identify the datagram and stored in a single field. Examples of single field identifiers include the 16-bit identification 110 in the IPv4 header or the 32-bit identification 170 in the IPv6 header. Multiple field datagram identifiers represent identifiers where two or more fields combine to form the datagram identifier. For example, identification 110 could combine with another field in the header or possibly the payload to form the datagram identifier. Alternatively, a single value for the datagram identifier could be replicated multiple times within the datagram. For example, as will be discussed in a later section a single datagram identifier value could be stored in the header of an IPv4 packet as identification 110 and replicated within the payload of the datagram itself. Other fields that could be used in a datagram identifier GUIDs, checksums, or other values that increase the "uniqueness" of the datagram identifier throughout the lifetime of the datagram.

Multiple Field Datagram Identifiers: Single Valued

Figure 2:
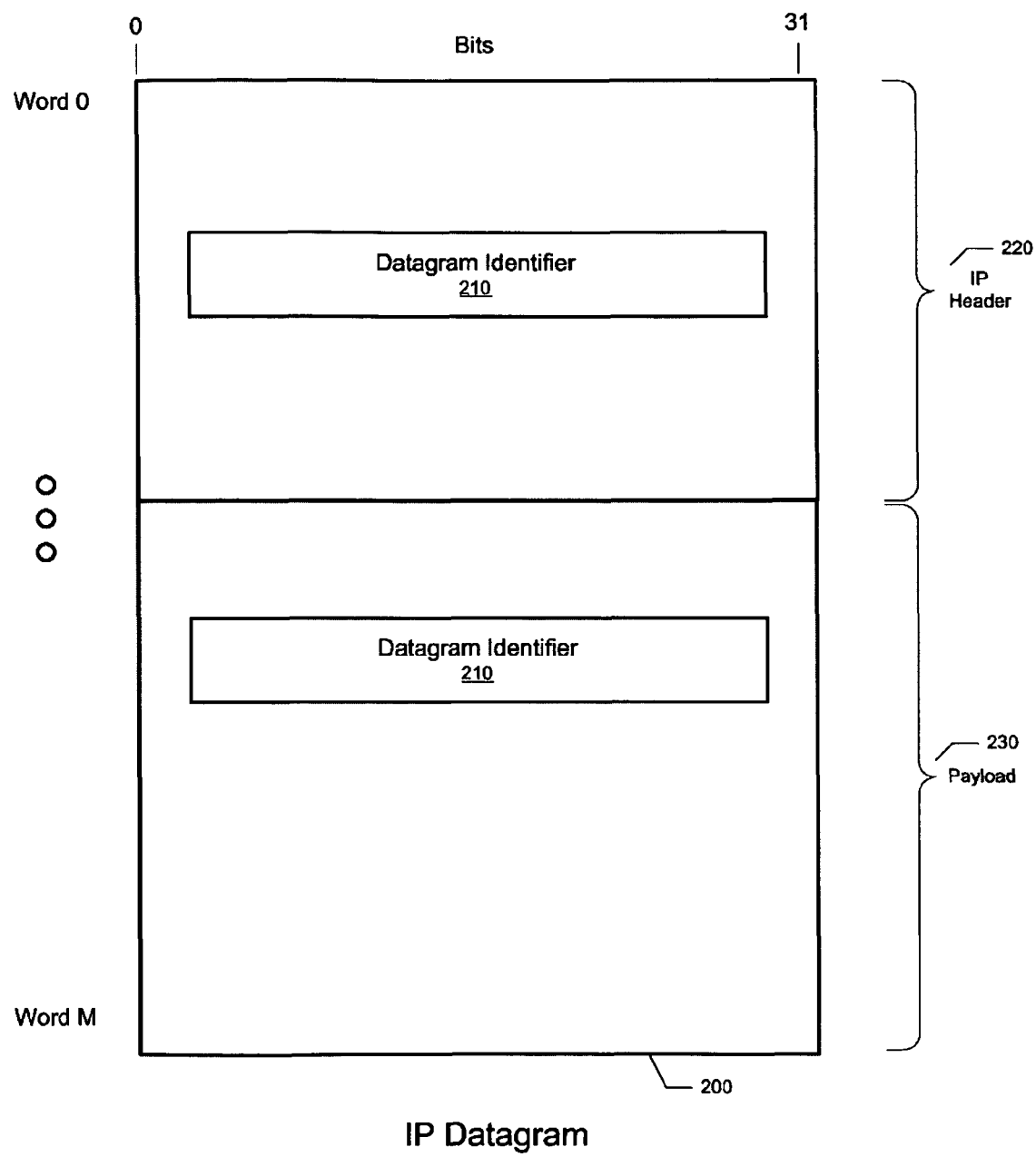
FIG. 2 illustrates a possible embodiment of a multiple field datagram identifier where the value of the datagram identifier is replicated.

FIG. 2 illustrates a possible embodiment of a multiple field datagram identifier where the value of the datagram identifier is replicated. In a preferred embodiment, the datagram identifier is placed in the identification field of the IP header, and then also placed within the payload of the datagram. Datagram 200 represents a typical IP datagram having header 220 and possibly payload 230. In this embodiment datagram identifier 210 is replicated within header 220 and payload 230. For IPv4 datagrams, datagram identifier 210 in header 220 is at least partially stored in identification 110 from FIG. 1A. For IPv6 datagrams, datagram identifier 210 in header 220 is at least partially stored in identification 170 in the fragment header from FIG. 1B. It is contemplated that datagram identifier could be any size including 16-bits, 32-bits, 48-bits, 64-bits, or greater.

Replicating datagram identifier 210 within payload 230 offers several advantages. One advantage relates to applications where it is infeasible to change the internal workings of the IP module. Placing datagram identifier 210 in payload 230 provides the application control over datagram identifier 210. An additional advantage includes resolving the datagram corruption problem without necessarily modifying the standard datagram header structure. Following sections will further clarify how placing datagram identifier 210 in the payload offers greater control over the "uniqueness" of the datagram identifier. It is contemplated the value of datagram identifier could be replicated any number of times as is desired, useful, or necessary.

Multiple Field Datagram Identifiers: Multi-valued

Figure 3:
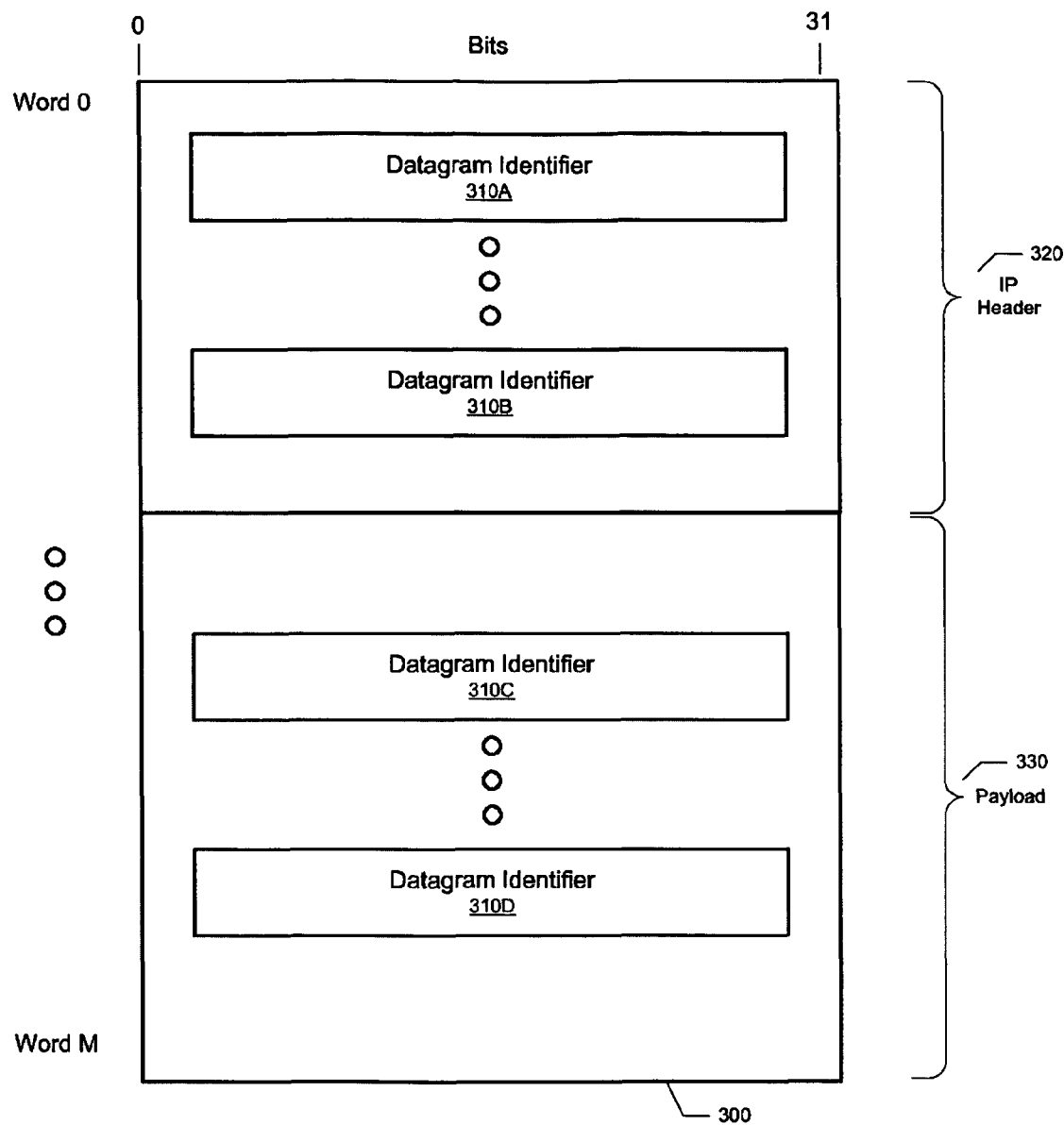
FIG. 3 illustrates a possible embodiment of a multiple field datagram identifier where the datagram identifier comprises multiple values in different fields.

FIG. 3 illustrates a possible embodiment of a multiple field datagram identifier where the datagram identifier comprises multiple values in different fields. Datagram 300 comprises header 320 and payload 330. In this embodiment, datagram 300 is identified via a datagram identifier that is split among two or more fields as represented by datagram identifiers 310A through 310D. The fields spread among header 320 or payload 330 as desired. The additional fields allow for extending the resolution of the datagram identifier by increasing the number of available datagram identifiers in the pool.

Preferred embodiments of multi-valued fields are located in an optional field within the header of an IP datagram. Using optional header fields minimally impacts changes to existing IP modules because the fields are optional. When a modified IP module exchanges datagrams having the optional header fields with a legacy IP module, the legacy IP module should ignore any unknown options thereby resulting in legacy behavior. When a modified IP module exchanges datagram with another modified IP module that understands the optional header fields, then a higher resolution datagram identifier resolves the datagram corruption problem.

Multiple Field Datagram Identifiers: Multi-Valued IPv4 Datagram Identifier

Figure 4A:
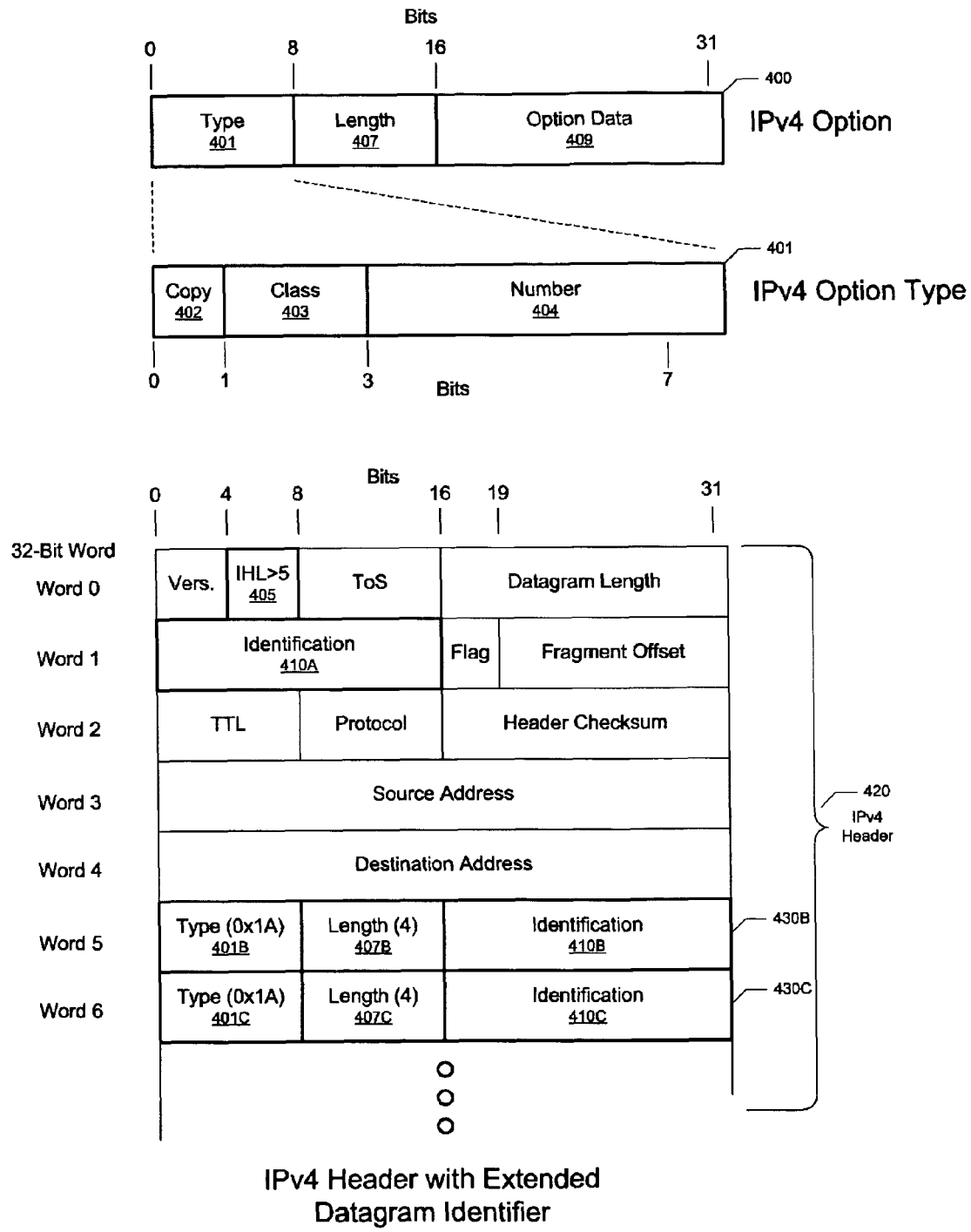
FIG. 4A illustrates a possible embodiment of a multiple field datagram identifier for IPv4 where the datagram identifier comprises the use an IP option.

FIG. 4A illustrates a possible embodiment of a multiple field datagram identifier for Ipv4 where the datagram identifier comprises the use an IP option. An Ipv4 header option structure is defined in RFC 791. Option 400 comprises three fields including type 401, length 407, and option data 409. Length 407 represents the total number of bytes in the option including type 401, length 407, and option data 409. Option data 409 includes information relating to the option and can comprise zero or more bytes of information. Type 401 is further segmented into three fields that are also defined in RFC 791. Copy 402 indicates if option 401 is copied into all fragments of the datagram. Class 403 indicates whether option 400 is for control, a value of 0.times.0, or for measurement, a value of 0.times.3. Number 404 represents a value ranging from 0 to 32 indicating what the option actually represents. The International Assigned Number Association (IANA) assigns these values. At the time of writing this document values 0 to 21 and 23 to 24 have been assigned.

In a preferred embodiment, an additional datagram header option defines an extended datagram identifier as illustrated in IPv4 header 420. Header length 405 has a value greater than five to indicate there are additional 32-bit words beyond the minimum of five in the header. For example, one or more of datagram fragment identification options can be added to header 420 as indicated by options 430B and 430C. Identification 410A stores at least part of the datagram identifier. Additionally, identification 410B and 410C extended the resolution of the datagram identifier. It is contemplated that type 401B or 401C could have a value of 0×1 A (Copy=0×0, Class=0×0, Number=26 (0×1 A)) to indicate the option is an extended datagram fragment identification option. Length 407B or 407C could have a value of four to indicate that total option size is four bytes. In this embodiment identification 410B or 410C offer additional 16-bits to the datagram identifier. If more resolution is required, additional options can be added. The example embodiment illustrates a datagram identifier having 48-bits comprising identification 410A, 410B, and 410C. Although this example illustrates one embodiment for extending the pool of available datagram identifiers, one skilled in the art will recognize that other possible implementations to increase the pool of available identifiers also exist. For example, rather than repeating all the option information, the length of a single option could be increased to include bytes from subsequent 32-bit words; therefore, the length field would have a value of eight bytes where two bytes come from the header identification field and six bytes come from the datagram fragment identification option fields. Consequently, the option would comprise up to 48-bits of additional resolution creating a datagram identifier of 64 bits. By changing the option length value, the datagram identifier resolution could be increased eight bits at a time.

Multiple Field Datagram Identifiers: Multi-valued IPv6 Datagram Identifier

Figure 4B:
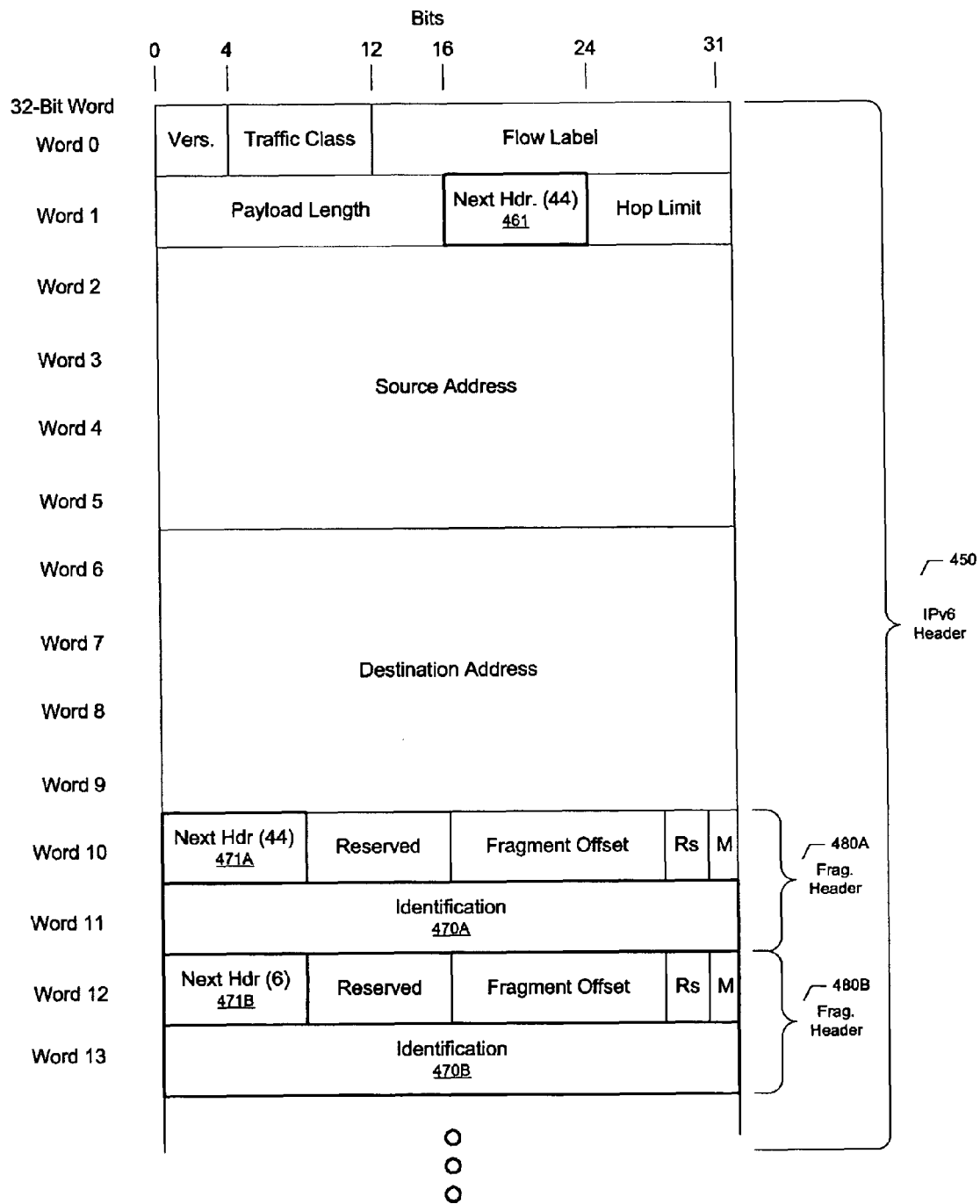
FIG. 4B illustrates a possible embodiment of a multiple field datagram identifier for IPv6 where the datagram identifier comprises multiple fields in an IPv6 header using multiple fragment headers.

FIG. 4B illustrates a possible embodiment of a multiple field datagram identifier for IPv6 where the datagram identifier comprises multiple fields in an IPv6 header using multiple fragment header options. IPv6 header 450 includes the standard fields and two or more fragment headers as indicated by fragment headers 480A and 480B. Next header 461 stores a value of 44 indicating that the next header is a fragment header. Fragment header 480A includes next header 471A that indicates the next header is also a fragment header. Zero or more fragment headers can be included in the overall datagram. In this example embodiment, fragment header 480B indicates that next header is TCP via a value of six stored in next header 471B. The datagram identifier for this datagram comprises two or more identification fields as indicated by identification 470A and 470B. Including multiple fragment headers provides for an IPv6 datagram to have its datagram identifier extended in 32-bit chucks. It is contemplated, that a change to the IPv6 fragment header would be more beneficial to allow an IPv6 module to change the fragment header as desired when conditions on the network change. Using multiple fragment headers allows for increasing the number of available datagram identifiers in the pool; consequently, the size of the pool exceeds the ability of the system to consume all datagram identifiers within the lifetime of a datagram.

Preferred embodiments utilizing multi-valued datagram identifiers use the existing header identification fields as the Least Significant Bits (LSB) of the datagram identifier. By placing the LSB in the existing fields, interoperability can be maintained with legacy IP modules. It is also contemplated that new optional header fields could be defined to take over the role of the identification fields. Therefore, the datagram identifier would only be stored in the new optional fields as a single field identifier.

The previous embodiments offer a solution for the datagram corruption that involves providing a pool of datagram identifiers through increasing the number of available datagram identifiers that can be assigned to a datagram. Controlling the datagram identifiers in this way resolves the datagram corruption problem. In preferred embodiments, such an approach is beneficially applied to IP layers of network communication stacks without affecting applications. However, it might be impractical for the solution to be deployed because the sheer number of IP modules deployed in the field that have to be updated. It is contemplated that communication stacks including Windows or Linux could be updated expeditiously to some degree; however, there are millions of devices having legacy stacks that would remain including routers, gateways, printers, or other devices having legacy stacks. In which case, an application level approach could be taken by device manufactures that involve multiple field datagram identifiers having a single value. A pool of datagram identifiers is created that has a reduced number of available datagram identifiers and where the datagram identifiers are controlled during the lifetime of a datagram.

Reduced Datagram Identifier Pools

Preferably when a more application centric solution is useful, the datagram identifiers are controlled through an agreement between two hosts regarding which datagram identifiers are allowed to be used. In a preferred embodiment, a first host creates or controls a pool of datagram identifiers by making sure any datagram identifier in use will not be used again for the lifetime of a datagram to which the datagram identifier is assigned. The pool has a reduced number of available datagram identifiers because some of the identifiers might currently be in use. The first host sends a second host a suggested datagram identifier drawn from the pool. The second host uses the suggested datagram identifier in a response datagram sent back to the first host. The second host encodes the suggested datagram identifier in the header and in the payload of the response datagram. The first host receives the response datagram normally. Once the datagram is reassembled, the first host reads the suggested datagram identifier from the payload of the response datagram and places it back in the pool for use again.

Figure 5:
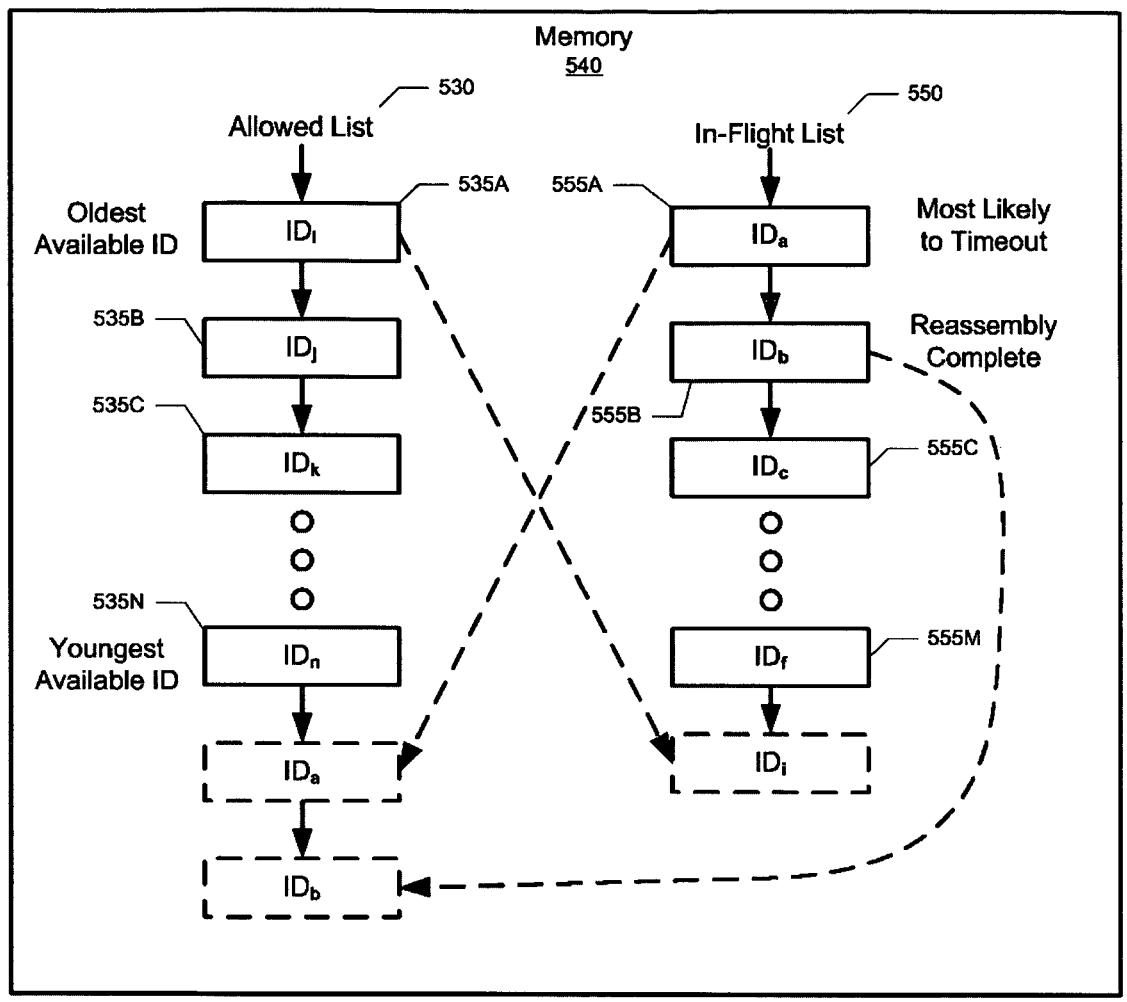
FIG. 5 illustrates an embodiment of a memory storing lists of datagram identifiers.

Reduced Datagram Identifier Pools: Lists of Allowed and Excluded Datagram Identifiers FIG. 5 illustrates an embodiment of a memory storing lists of datagram identifiers. Memory 540 is associated with a host that creates or controls a pool of datagram identifiers having a reduce number of available datagram identifiers. Allowed list 530 represents a list of datagram identifiers that are allowed to be assigned to datagrams. List 530 comprises zero or more datagram identifiers as indicated by IDs 535A through 535N. Each element in the list could comprise the actual identifier or an indirect reference to the identifier. Preferably the list is implemented as a linked list because the order of identifiers could change due to different having different lifetimes. Further more the preferred list is ordered in a manner that the oldest identifiers are near the head of the list and the most recently used identifiers are at the tail of the list. Arranging list 530 in this manner ensures that datagrams assigned an identifier from the list have an identifier that is not in use or has exceeded the lifetime of a previously used datagram identifier.

In-flight list 550, in a preferred embodiment, represents those identifiers that are currently being used and; therefore, represent the identifiers that are excluded from being used. In that sense, list 550 comprises an exclusion list. In a preferred embodiment, list 550 comprises zero or more identifiers as represented by identifier 555A through 555M ordered by timeout. Those identifiers that are expected to time out first are nearer the head of the list than those that are most recently deployed which are placed at the tail of the list. Similar to list 530, list 550 can be implemented through a linked list.

In one embodiment, when a datagram identifier is required, the identifier is drawn from the head of list 530 and placed at the tail of list 550 as indicated by identifier 535A. Once removed from allowed list 530, the datagram identifier is controlled from being again until the lifetime of the datagram to which it is assigned has been exceeded. In a preferred embodiment, there are two conditions under which an identifier in list 550 can be removed and placed back in list 530. The first condition is that the datagram to which the identifier is assigned has been received and correctly reassembled. Up on reassembly, the payload of the datagram is checked for the identifier and the identifier is removed from list 550 and placed at the tail of list 530 as indicated by identifier 555B. The second condition is that the datagram's lifetime has been exceeded. Under such conditions, the identifier is removed from list 555A and placed at the tail of list 530 as indicated by identifier 555A. A datagram lifetime used for controlling list 550 can be determined in many ways; preferably, it is simply larger than the reassembly time within an IP module.

Consider, for example, an embodiment using IPv4 as a transport for datagrams over an IP. Initially list 530 comprises a maximum of 65,535 datagram identifiers because the IPv4 header only supports a 16-bit identification field as previously described. As datagram identifiers are used, the list becomes shuffled; however, this does not matter because the value of the identifier does not matter as long as the identifier lasts for the lifetime of the datagram. For computer workstations having sufficient memory storing a list of 65,535 identifiers is not a problem. Through using these techniques, a host create a pool of datagram identifiers that has a reduced number of available datagram identifiers that are allowed to be assigned to a datagram; thereby, resolving the data corruption problem. The resulting pool is different than the initial pool of available datagram identifier because there a different number of datagram identifiers that are actually available and the identifiers are controlled.

Although workstations typically have sufficient memory for storing 65,535 identifiers in linked lists, other systems do not have such luxury. Embedded devices have less memory and should make use of space saving techniques for conserving memory. Some embodiments use a reduced set of identifiers that can expand if necessary. For example, rather than controlling all 65,535 identifiers, a device might only use 1024 identifiers numbered 1 through 1024. If this pool is insufficient, it can be expanded by allowing identifiers 1 through 2048 or contracted as necessary if transfer rates fall. Controlling smaller lists or recycling available identifiers in this fashion offers benefits for IPv6 implementations where is could be impractical to store all possible $2^{32}$ datagram identifiers.

It is contemplated that the reduced pool could have further characteristics. For example, one should note by having a first host suggest a single datagram identifier to a second host, the resulting number of available datagram identifiers is effectively one. In addition, most devices have more than one type of traffic associated with them. Therefore, one could reduce the list of allowed datagram identifier to only those having specific bit pattern, for example limiting the list to those identifiers with the most signification bits (MSB) set. The identifiers using only the LSB could be used for normal traffic. One should note that a block of identifiers could also be suggested to the second host representing a plurality of available datagram identifiers.

To further illustrate an example embodiment, in IPv4 the identification field is 16-bits. Allowed list 530 could comprise only those identifiers that have the two most significant bits set which creates a pool of 49,152 ($2^{16}-2^{14}$) available identifiers, leaving 16,384 ($2^{14}$) identifiers that are uncontrolled and available for other traffic. Preferably, the pool has a reduced number of available datagram identifiers that is a function of powers of two, for example, $2^M-2^N$ where M is the size of the identification field in bits and N has an integer value less than 32. As N approaches M, the available number could be reduced to a small number, one or even zero.

Memory 540 represents a memory associated with a computing system. In a preferred embodiment a computer or a device operating as a client comprises memory 540 and uses the lists to access a remote device. Example remote devices include network storage devices, printers, faxes, scanners, or other devices that use IP to communicate. Embodiments of memory 540 include using RAM, flash, disk drives, or other data storage memories accessible by a computing device on a network.

Reduced Datagram Identifier Pools: Example Method of Controlling Identifiers

Figure 6:
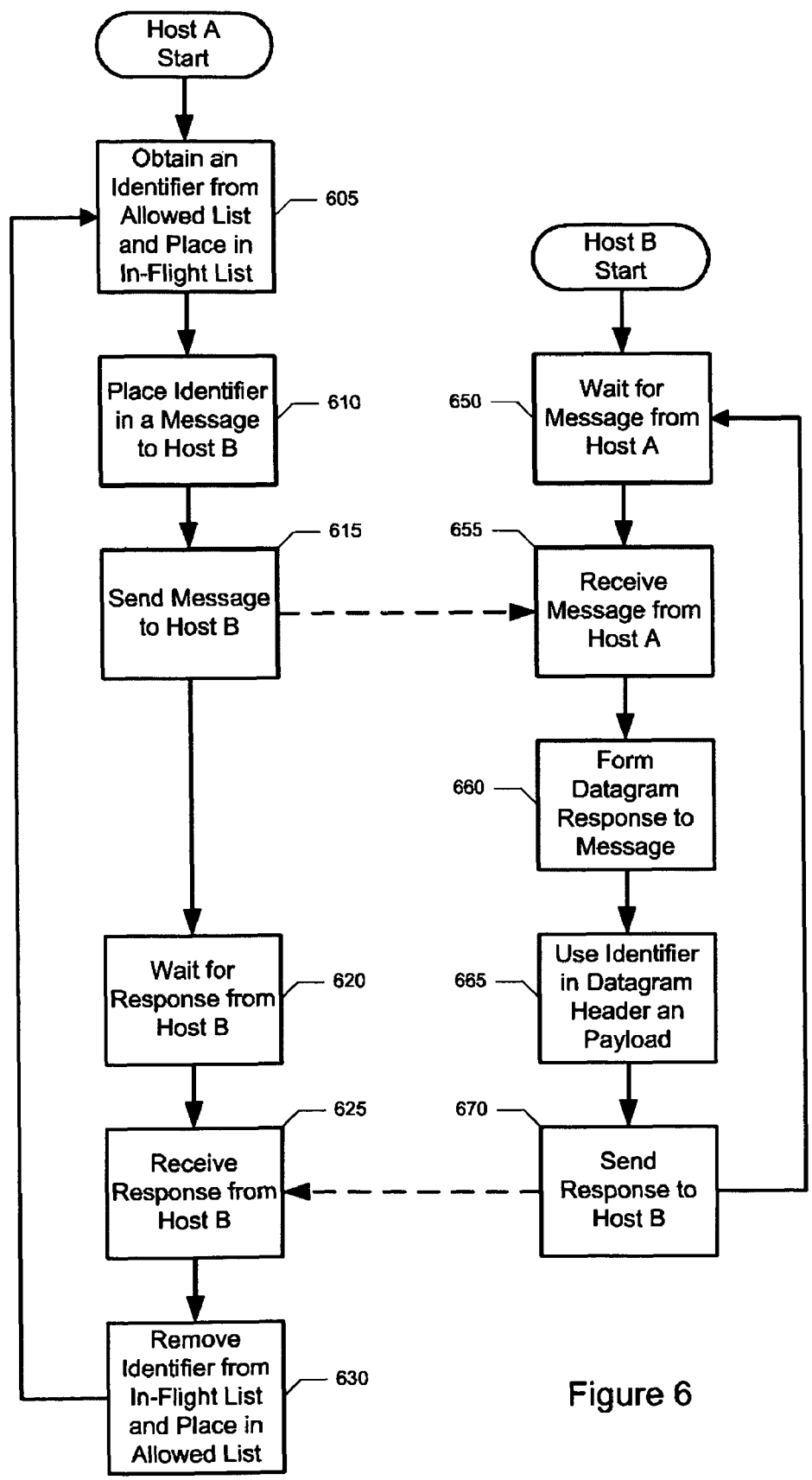
FIG. 6 presents an example embodiment of a method for controlling the reuse of datagram identifiers that are drawn from a pool of datagram identifiers that have a reduced number of available datagram identifiers.

FIG. 6 presents an example embodiment of a method for controlling datagram identifiers drawn from a pool of datagram identifiers that have a reduced number of available datagram identifiers. The example in FIG. 6 utilizes the lists previously described coupled with a multi-field datagram identifier having a single value. In the example, host A represents a device on a communication link that desires access to host B which is also accessible over the communication link. The communication link utilizes IP to convey datagrams from host A to host B and vice versa in a manner that supports fragmentation if necessary. For example, host A could represent a client computer and host B represents a network storage server. In some embodiments, the client uses UDP datagrams to access data on the storage server.

At step 605 host A wishes to exchange messages with host B utilizing datagrams. In this example, host A expects a response to its request. Consequently, host A draws a datagram identifier from an allowed list of datagram identifiers that represents those datagram available for use. The identifier is place in an in-flight list so that the identifier is excluded from being used again for the lifetime of the datagram to which is assigned. Meanwhile at step 650, host B waits for the message from host A.

At step 610 host A prepares a message for host B. Preferably the message comprises a request that host B take some action including responding to host A's message. Host A places the identifier within the message to host B. It is contemplated that the identifier is placed in the payload of a datagram. One should note in this example embodiment the identifier is not assigned to host A's datagram, but is rather a suggestion meant for the datagram comprising host B's response.

At step 615 host A sends the message to host B over the communications link. For example, host A calls a BSD socket send( ) call to send the message over an IP network. At step 655 host B receives the datagram from host A. Preferably the message from host A is small enough that it won't be fragmented, for example, if the total datagram size is less than 576 bytes for IPv4 the datagram should not be fragmented. Host A expects a response from host B, so at step 620 host A waits for the response. One skilled in the art of network applications will recognize this scenario as being similar to a client-server exchange.

At step 660 host B forms a response to host A's message. During this step host B reads host A's message or reviews the message's datagram to find the suggested identifier. In some embodiments, the identifier is encoded in conjunction with the message's request command so the two can be found and correlated easily. In some embodiments, the datagram identifier can also be used as a transaction ID. At step 665 host B uses the identifier as the datagram identifier for the datagram comprising its response message. In the case of IPv4, host B would place the identifier in the identification field of the IPv4 header or in the case of IPv6 host B would place the identifier in the identification field of the fragment header. In addition, host B encodes the identifier in the payload of the datagram. An astute reader will note that in this embodiment host B has an IP module adapted to allow such a datagram identifier manipulation to take place.

At step 670 host B sends the datagram comprising the response message back to host A. Host A receives the datagram at step 625. At this point the datagram could be fragmented and might arrive over a period of time. Host A attempts to reassemble the datagram comprising the response message as a function of the identifier. In this situation where host A controls the use of the identifier there is no risk for datagram corruption. Further more, host A operates normally at the IP layer without requiring modification to host A's IP module because the datagram appears as a normal datagram.

In a preferred embodiment, there are two circumstances to consider associated with the received response datagram from host B: the datagram is reassembled properly, or the datagram is not reassembled. The datagram might not be reassembled because one or more fragments might have been lost. If the datagram is reassembled properly, then host A can process the response. As host A processes the response, it reads the datagram identifier encoded in the response datagram's payload. Host A now knows that the identifier can be reused because the datagram has arrived safely and the datagram's lifetime is over; consequently at step 630 host A removes the identifier from the in-flight list and places it at the tail of the allowed list. If the datagram is not reassembled properly due to loss of fragments, the datagram will be stored in the communication stack, possibly in host A's IP module, until a timeout occurs, typically on the order of 30 to 120 seconds after which the datagram is discarded. At this point, host A still must deal with the identifier for the discarded datagram. Preferably host A has a timeout associated in-flight datagram identifiers. When the timeout has been exceeded indicating the lifetime of the datagram has expired, host A removes the identifier from the in-flight list and places the identifier at the tail of the allowed list.

The in-flight list timeout of identifiers is preferably longer than the timeout associated with reassembling datagrams, possibly as long as 300 seconds. Especially preferred embodiments couple the timeouts of the in-flight list to conditions on the communications link. Some conditions have measured values including round trip time, throughput, congestion, error rates, or other measurable conditions. Other conditions might not necessarily be measured but set according to a policy. For example, the timeout might be configured by an administrator based on the speed of the network.

The reader should note the advantages the proceeding approach has for ensuring the datagram identifiers are not reused again during the lifetime of the associated datagram. One host uses application level code to manage the identifier lists without having to change the existing communication stack on the host. This is advantageous for implementations having software applications running on established operating systems including Windows or Linux where is impracticable to make changes to the IP modules. Most application developers do not have access to communication stack internals. In addition, the approach is advantageous for vendors of embedded devices where the vendor has access to the source code of the communication stack of their devices. The vendor can modify the device's IP module to operate as described. For example companies that produce network storage products can modify their products to have the described characteristics. Furthermore, by encoding the identifier information within a message, no additional messages are required to establish the unique nature of the datagram identifier. In addition, the described approach ensures compliance to IP standards where datagram identifiers are required to be unique for the lifetime of the datagram.

Especially preferred embodiments employ the described techniques for command-response protocols including storage protocols. Storage protocols include proprietary protocols including Zetera's Z-SAN protocol or standard protocols. Standard storage protocols include iSCSI, FCIP, or iFCP. The technique can be applied to those protocols using UDP or TCP as a transport layer. For example, iSCSI implementations could be modified to exchange suggested datagram identifiers to ensure TCP datagrams do not suffer from datagram corruption while maintaining conformance to the iSCSI standard.

Providing Pools of Datagram Identifiers

Figure 7:
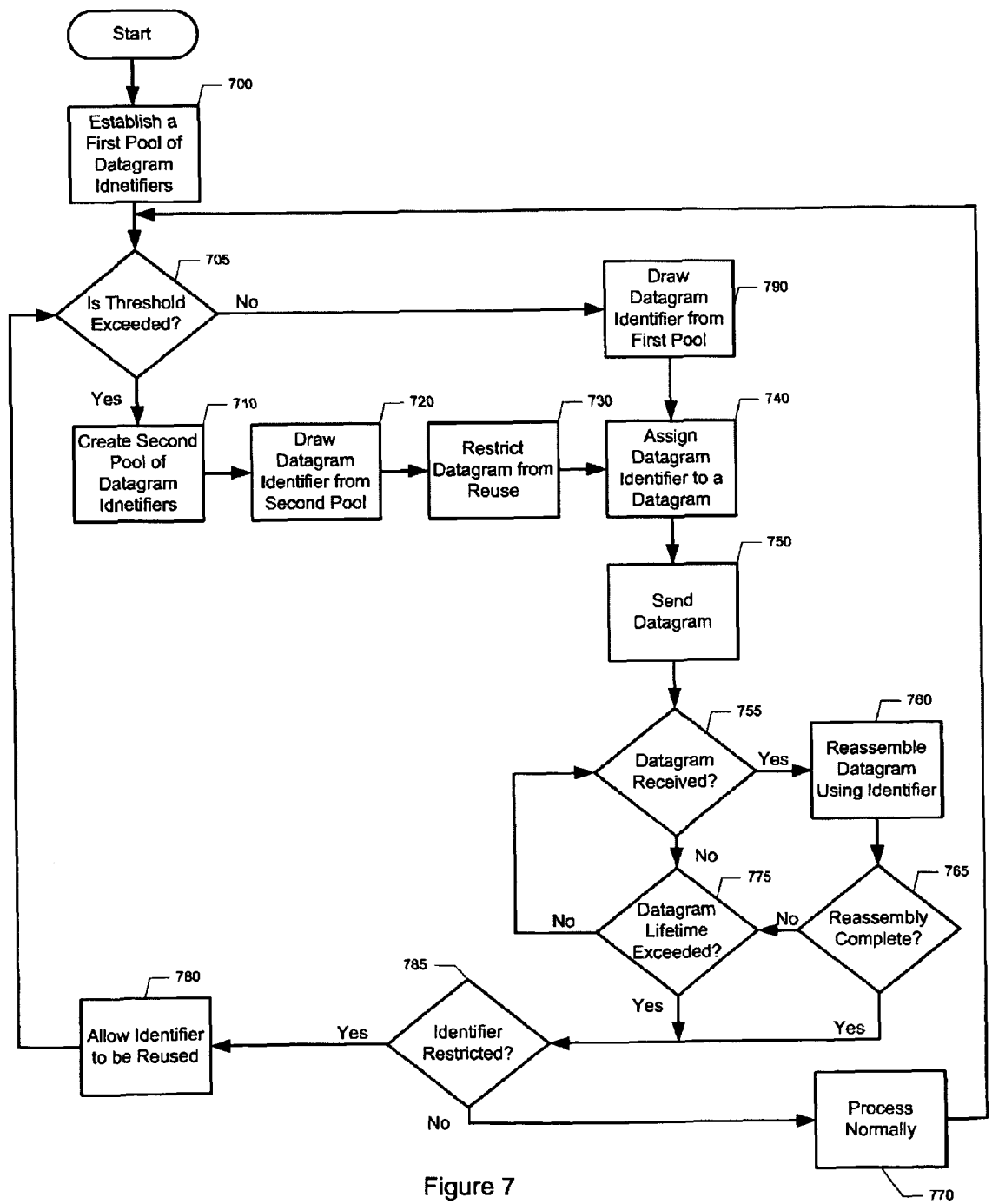
FIG. 7 illustrates an example embodiment of a method where a pool of datagram identifiers is created to ensure datagram corruption does not occur.

FIG. 7 illustrates an example embodiment of a method where a pool of datagram identifiers is created to ensure datagram corruption does not occur. The presented example employs many of the concepts previously presented.

At step 700 a first pool of datagram identifiers is established. In a preferred embodiment, the first pool represents the pools available in response to operating according to the standard working of IP. In IPv4, the first pool comprises the $2^{16}$ identifiers available for use due to the 16-bit identification field in the IPv4 header. In IPv6, the first pool comprises the $2^{32}$ identifiers available for use. In both cases typically the first pool is implemented by an incrementing counter. Counter to the standards, these pools do not provide unique identifier over the lifetime of the associated datagram when datagrams are deployed on sufficiently fast communication links. A second pool that provides available datagram identifiers having stronger uniqueness characteristics resolves the problem.

To maintain backward compatibility with legacy IP modules, a preferred embodiment comprises a threshold function to determine if a second pool of datagram identifiers is useful or not. In one embodiment, a threshold function monitors the conditions of the communications between a first host and a second host over the communication link to determine if datagram identifiers should be controlled. A preferred embodiment uses a function that relates to the lifetime of a datagram to couple more closely the lifetime to the usage of datagram identifiers.

Preferred threshold function embodiments operate as a function of a timeout period or rate at which datagrams are transferred over the communication link. Especially preferred embodiments use both the timeout period and the rate. For example, the threshold function could include calculating if a wrap condition could occur in a datagram identification field for a given data rate. If the datagram transfer rate multiplied by the datagram reassembly timeout exceeds the number of available datagram identifiers, then a wrap in the identification field could result in datagram corruption. Under such conditions, the threshold function indicates a second datagram identifier pool is beneficial. It is contemplated that the threshold function could operate as a function of other values other than a rate or timeout period including congestion. Consequently, all threshold functions are contemplated. It is also contemplated that the second pool can be toggled on or off as necessary to adapt to legacy IP modules. For example, it might be beneficial to not use the second pool when working with a legacy IP module to ensure CPU cycles are not wasted.

In addition, the values that are used in the threshold function can be measured or predetermined. A measured value can be taken in real-time or over time as the system operates. For example, the rate could be measured by calculating round trip times of messages between two hosts or the rate could be measured over the entire communication link. A predetermined value includes the network bandwidth, 1 Gbps or 10 Gbps rates for Ethernet, for example.

At step 705 a decision is made regarding using the second pool of datagram identifiers. If a second pool is not useful, then at step 790 a datagram identifier is drawn from the first pool of datagram identifiers and processing continues in the traditional manner. If a second pool is useful as indicated by the threshold function, then the second pool can be instantiated.

At step 710 the second pool of datagram identifiers is created. Providing the second pool of identifiers represents establishing a set of conditions where the datagram identifiers in the second pool are controlled in a manner that ensures they are unique for the lifetime of a datagram relative to the first pool of datagram identifiers. Therefore, the second pool is different from the first pool because the number of available datagram identifiers is different or the control over the datagram identifiers is greater. Providing the second pool includes a priori modifying an IP module before run-time or altering the behavior of the IP layer at or during run-time. The creation of the second pool further includes increasing the number of available datagram identifiers in a manner that over comes the limited supply available in the first pool causing the datagram corruption problem. Increasing the number of available datagram identifiers can be achieved as previously described through the use of additional header options comprising extended datagram identifier information. The creation of the second pool also includes decreasing the number of available datagram identifiers for a datagram. Decreasing the number includes maintaining lists of allowed datagrams identifiers or suggesting a single datagram identifier or block of identifiers. In both cases increasing the number or decreasing the number of available datagram identifiers, the datagram identifiers are controlled from taking a value that causes the datagram corruption problem within the lifetime of a datagram. More than one second pool can be created for various reasons. Multiple second pools allows for establishing a pool for each host pair, for a protocol designation (TCP, UDP, ICMP, IGMP, etc. . . . ), or even for each transport protocol port. For example, all HTTP traffic on port 80 could have a pool while FTP traffic on port 21 could have a different pool. Having more than one second pool further ensures datagram identifiers are unique as required by the IP standards.

Once the second pool of datagram identifiers is established, a datagram identifier is drawn from the second pool at step 720. Drawing the datagram identifiers includes using the next identifier in a list or receiving a suggestion of a datagram identifier to use. In the case of using a list, the identifier is taken from an allowed list of identifiers or in the case of having a large pool, the identifier is generated by incrementing a counter similar to what is done in legacy IP modules.

At step 730 the datagram identifier is controlled from being reused. In preferred embodiments the identifiers are controlled from being reused during the lifetime of the datagram by ensuring the second pool has sufficient number of available datagram identifiers that an identifier can not be used within a defined timeout period associated with the datagram lifetime. In other preferred embodiments, the datagram identifier can be controlled by keeping track of which identifiers from the second pool have been used.

At step 740 the datagram identifier is assigned to a datagram. In preferred embodiments the assignment includes placing at least a portion of the datagram identifier in an identification field of an IP header. In other embodiments, a portion of the identifier is placed in optional header fields. In yet other embodiments, a portion of the identifier is place in the payload of the datagram. Once the datagram is formed and the datagram identifier is placed within the datagram, the datagram is sent to a remote host at step 750. One skilled in the art of network applications will recognize that sending a datagram can be achieved in many ways include using ICMP, IGMP, UDP, TCP, constructing a raw datagram on an IP layer, or any other type of protocols forming datagrams.

At step 755 a check is made to see if the datagram is received or not. At any time from sending to reception of the datagram, the datagram could be fragmented. In IPv4 networks, the fragmentation could occur on the network by intermediary devices including routers. In IPv6, the source of the datagram could have fragmented the datagram. If one or more fragments of the datagram have been received, the datagram is reassembled at step 760 using the datagram identifier or other information useful to identifier datagram fragments during reassembly. Other useful information includes IP address, protocol number, port assignment, or other datagram information. At step 765 a check is made to see if the datagram has been completely reassembled.

If no fragments of the datagram have arrived yet, a decision is made with respect to the lifetime of the datagram at step 775. In some embodiments the check is made at an application layer where a host is waiting for a response message. If the datagram lifetime has not been exceeded, the system continues to wait for the datagram by returning to step 755. Waiting for the datagram proceeds until either the datagram is completely reassembled or the lifetime has been exceeded.

At step 785 a check is preformed to determine if the identifier associated with the datagram has been controlled. In preferred embodiments when the datagram's payload comprises the identifier or when an optional header field is used, the datagram identifier has been controlled. If not, then the datagram is processed normally as a legacy IP module would process it. Otherwise the datagram identifier is allowed to be reused again at step 780. In some embodiments, the identifier is moved from an in-flight or excluded list to an allowed list. In other embodiments, the second pool is sufficiently large that a datagram identifier based on a large counter will not wrap allowing the identifier to be reused after the datagram lifetime has been exceeded.

Advantages

Employing the disclosed techniques offers many advantages when resolving the datagram corruption problem. In one embodiment the solution operates at an IP layer well below an application layer. An IP layer solution ensures that applications do not have to be modified to work properly. In addition, through the use of optional IP header fields there is minimal impact with respect to older devices running legacy IP modules. A legacy IP module should operate normally by ignoring unfamiliar optional headers. Also through using multiple optional headers or creating optional headers that have extended information, the system is future proofed. When data rates increase causing the pool of available datagram identifiers to become insufficient, the datagram identifiers can be extended by tacking one more optional datagram identifier fields when useful. Placing the LSB portion of the datagram identifier in the IP header identification fields ensures backward compatibility and a fall back position to legacy behavior. The use of checksums to resolve identifier collisions is no longer necessary because the datagram corruption problem is resolved; consequently, applications similar to NFS do not have to consume CPU cycles which could result in reduce throughput.

For situations where it is impracticable to make modifications to the IP modules of a set of hosts, vendors that develop networking applications or devices can also employ the disclosed techniques. Controlling the datagram identifiers that are available or in-flight, ensures the datagram identifiers are controlled from being reused under conditions that otherwise could result in datagram corruption. A vendor can modify the IP module for their products to protect datagrams and have a corresponding software module on a system that accesses the product that controls the datagram identifiers. Example software modules for network devices include device drivers.

Coupling datagram lifetimes more closely with datagram identifiers provides for greater control over the uniqueness of the identifiers. Consequently, developers can ensure compliance with existing standards and future proof against additional datagram corruption problems.

Additional Considerations

One skilled in the art of network protocols will appreciate there are additional concepts that fall within the scope of the inventive subject. Concepts include the following items, but are not limited to the following items:

- ICMP offers a control mechanism designed for handling IP communication problems. ICMP modules could also be modified to aid in resolving the datagram corruption problem through additional ICMP messages or extending previously defined ICMP messages.
- The disclosed methods work well for transaction oriented protocols. In addition the methods also work for streaming protocols including TCP.
- The method can be deployed symmetrically where two communicating hosts both employ the methods or asymmetrically where only one host employs the methods while the other operates in a legacy mode.
- A third host could control datagram identifiers to ensure the system as a whole uses unique datagram identifiers. As hosts communicate they could acquire one or more allowed datagram identifiers; preferably large blocks of allowed identifiers. For example, a DHCP server could hand out blocks of available datagram identifiers.
- Although uniqueness is defined by the standards for the lifetime of the datagram, identifiers including Globally Unique Identifiers (GUIDs) could also be used to ensure the datagram is always unique regardless of the lifetime of the datagram.
- A datagram identifier that is unique, even for a limited time period, can also function as a transaction identifier for transaction based systems. For example, network storage clients that expect multiple responses can use the transaction identifier to facilitating differentiating multiple responses from a plurality of storage devices.
- During the transition from IPv4 infrastructure to IPv6 infrastructure one or more of the presented techniques could be employed to resolve the datagram corruption problem. For example, if IPv6 is tunneled over IPv4, then an IPv4 approach could be used to protect IPv6 datagrams. Then the IPv6 approach can be used to protect application data.

Although network storage devices are referenced as examples, one should appreciate the same techniques can be applied equally well to any network device. Network devices include any device that is accessible over communication link using datagrams. Examples of network devices include printers, digital video records, media players, faxes, scanners, copiers, VoIP phones, or other devices.

Hardware

Other aspects relate to hardware associated with the inventive subject matter. It is contemplated that one could develop hardware for storing, prototyping, manufacturing, manipulating, managing, packaging, testing, physically controlling or supporting, or for other activities associated with the physical aspects of the inventive subject matter. Therefore, the inventive subject matter includes systems, methods, or apparatus for developing, producing, manufacturing, or running the hardware. In this sense, the hardware falls within the scope of the inventive subject matter.

Software

In still another aspect, it is contemplated that one could write software that would configure, simulate, or manage various aspects of the inventive subject matter and their associated infrastructure. From that perspective the inventive subject matter includes methods of writing such software, recording the software on a machine readable form, licensing, selling, distributing, installing, or operating such software on suitable hardware. Moreover, the software per se is deemed to fall within the scope of the inventive subject matter.

Thus, specific compositions and methods of resolving a datagram corruption problem using an internetworking protocol have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method comprising:
   selecting, by a first host device, a datagram identifier from a list of available datagram identifiers;
   placing, by the first host device, the datagram identifier in a list of unavailable datagram identifiers;
   transmitting, by the first host device, a datagram request to a second host device over a communication link, the datagram request including the datagram identifier;
   receiving, by the first host device, a datagram response from the second host device including the datagram identifier to identify a datagram, the datagram response further including a fragment of the datagram;
   removing, by the first host device, the datagram identifier from the list of unavailable datagram identifiers based at least in part on receipt of the datagram; and
   placing, by the first host device, the datagram identifier in the list of available datagram identifiers based at least in part on said removing.

2. The method of claim 1, further comprising:
   generating, by the first host device, the datagram request in a manner such that the datagram identifier is included in a payload of the datagram request.

3. The method of claim 1, wherein the datagram identifier does not identify a datagram transmitted by the first host device.

4. The method of claim 1, further comprising:
   receiving a plurality of datagram responses including a corresponding plurality of fragments of the datagram;
   assembling the plurality of fragments into the datagram; and
   removing the datagram identifier from the list of unavailable datagram identifiers and placing the datagram identifier in the list of available datagram identifiers based at least in part on said assembling.

5. The method of claim 1, further comprising:
   determining a timeout event associated with another datagram identifier in the list of unavailable datagram identifiers; and
   removing the another datagram identifier from the list of unavailable datagram identifiers and placing the another datagram identifier in the list of available datagram identifiers based at least in part on said determining of the timeout event.

6. A computing device comprising:

a controller configured
- to select a datagram identifier from a list of available datagram identifiers;
- to place the datagram identifier in a list of unavailable datagram identifiers;
- to generate a datagram request including the datagram identifier;
- to remove the datagram identifier from the list of unavailable datagram identifiers based at least in part on receipt of a datagram to which the datagram identifier is associated; and
- to place the datagram identifier in the list of available datagram identifiers when the datagram identifier is removed from the list of unavailable datagram identifiers; and a transceiver coupled to the controller and configured
- to transmit the datagram request to another computing device via a communication link; and
- to receive a datagram response, which includes the datagram identifier and a fragment of the datagram, from the another computing device via the communication link.

7. The computing device of claim 6, wherein the controller is configured to generate the datagram request in a manner such that the datagram identifier is included in a payload of the datagram request.

8. The computing device of claim 6, wherein the datagram identifier does not identify a datagram transmitted by the computing device.

9. The computing device of claim 6, wherein the controller is further configured to:
- assemble a plurality of fragments, including the fragment, into the datagram; and
- remove the datagram identifier from the list of unavailable datagram identifiers based at least further in part on a successful assembly of the datagram.

* * * * *

UNITED STATES PATENT AND TRADEMARK OFFICE
CERTIFICATE OF CORRECTION

| | | |
|---|---|---|
| PATENT NO. | : 7,924,881 B2 | |
| APPLICATION NO. | : 11/435239 | |
| DATED | : April 12, 2011 | |
| INVENTOR(S) | : Frank et al. | |

It is certified that error appears in the above-identified patent and that said Letters Patent is hereby corrected as shown below:

Page 3, item (56), under "Other Publications", in Column 1, Line 4, delete "Severless" and insert -- Serverless --.

Page 3, item (56), under "Other Publications", in Column 2, Line 1, delete "Sympsium" and insert -- Symposium --.

Column 1, line 2, below Title insert -- CROSS-REFERENCE TO RELATED APPLICATIONS --.

Signed and Sealed this
Sixteenth Day of August, 2011

David J. Kappos
*Director of the United States Patent and Trademark Office*